US012482085B2

United States Patent
Zamir et al.

(10) Patent No.: US 12,482,085 B2
(45) Date of Patent: Nov. 25, 2025

(54) METHOD AND PROCESS FOR AUTOMATED AUDITING OF INLINE QUALITY INSPECTION

(71) Applicant: Advanced Vision Technology (A.V.T.) Ltd., Hod Hasharon (IL)

(72) Inventors: Dani Zamir, Hod Hasharon (IL); Barry Ben Ezra, Ramat Hasharon (IL); Chanan Gazala, Kfar Saba (IL); Leon Kanelovitch, Hod Hasharon (IL)

(73) Assignee: Advanced Vision Technology (A.V.T.) Ltd.

( * ) Notice: Subject to any disclaimer, the term of this patent is extended or adjusted under 35 U.S.C. 154(b) by 415 days.

(21) Appl. No.: 17/983,923

(22) Filed: Nov. 9, 2022

(65) Prior Publication Data
US 2023/0153979 A1    May 18, 2023

Related U.S. Application Data (60) Provisional application No. 63/279,502, filed on Nov. 15, 2021.

(51) Int. Cl.
*G06T 7/00* (2017.01)
(52) U.S. Cl.
CPC .. *G06T 7/0004* (2013.01); *G06T 2207/20081* (2013.01); *G06T 2207/20084* (2013.01); *G06T 2207/30144* (2013.01)
(58) Field of Classification Search
CPC ......... G06T 2207/30144; G06T 7/0002; G06T 7/0004; G06T 2207/30108;
(Continued)

(56) References Cited

U.S. PATENT DOCUMENTS

| 8,315,453 B2 | 11/2012 | Shlain et al. |
| 10,234,848 B2 | 3/2019 | Mehr et al. |

(Continued)

FOREIGN PATENT DOCUMENTS

| CN | 104715481 A | 6/2015 |
| CN | 201610269163 A * | 8/2016 |

(Continued)

OTHER PUBLICATIONS

AquireAutomation.com, "New Acquire Automation LabelQ for Inline Inspection of Oriented Product Inspects Front & Back Labels on Bottles at up to 400 ppm", Machine Vision, Oct. 11, 2018, https://acquireautomation.com/news/2018/10/11/new-acquire-automation-labelq-for-inline-inspection-of-oriented-product-inspects-front-back-labels-on-bottles-at-up-to-400-ppm/, 2 pages.

(Continued)

*Primary Examiner* — Michael Horabik
*Assistant Examiner* — Stefano Anthony Dardano
(74) *Attorney, Agent, or Firm* — Buchanan Ingersoll & Rooney PC (57) ABSTRACT

A method and system for implementation of quality control includes a machine vision system for capturing images of instances of a product, and a computer system including computer memory containing machine-readable instructions executable by a processor. The processor evaluates the quality control images for a plurality of potential quality defects in the product and generates a defect alert associated with a captured image in which at least one potential quality defect is identified. Information about each defect alert is stored in a database log file in the computer memory. A neural network machine learning algorithm processes the database log file by, in a learning phase, receiving human-initiated input accepting or rejecting each defect alert and storing the human-initiated input in the log file, and, in an (Continued)

automated phase, automatically accepting or rejecting at least some defect alerts without performing the step of receiving human initiated input.

21 Claims, 3 Drawing Sheets

(58) Field of Classification Search
CPC .......... G06T 2207/20081; G06T 2207/20084; G01N 2021/8854; G01N 21/8851; G01N 21/89; G01N 2021/888; G01N 2021/8887; G01N 21/8803; G01N 2223/401; G01N 2223/646; G01N 2201/1296; G06V 2201/06
See application file for complete search history.

(56) References Cited

U.S. PATENT DOCUMENTS

| | | | |
|---|---|---|---|
| 10,254,750 | B2 | 4/2019 | Maeda |
| 10,539,952 | B2 | 1/2020 | Mehr et al. |
| 10,599,992 | B1* | 3/2020 | Cohen ............... G06N 5/02 |
| 10,713,769 | B2 | 7/2020 | Zhang et al. |
| 10,853,937 | B2 | 12/2020 | Niculescu-Mizil et al. |
| 10,921,782 | B2 | 2/2021 | Mehr et al. |
| 11,087,452 | B2 | 8/2021 | Niculescu-Mizil et al. |
| 11,475,553 | B1* | 10/2022 | Schultz ............... H04N 5/04 |
| 11,620,558 | B1* | 4/2023 | Xu ..................... G06N 7/01 706/12 |
| 2011/0069894 | A1* | 3/2011 | Vans ................ G06V 10/993 382/218 |
| 2019/0215410 | A1* | 7/2019 | d'Armancourt ... H04N 1/00029 |
| 2020/0218241 | A1 | 7/2020 | Soltanmohammadi et al. |
| 2020/0349875 | A1 | 11/2020 | Wen et al. |
| 2021/0096530 | A1 | 4/2021 | MarapaReddy et al. |
| 2021/0114368 | A1* | 4/2021 | Ukishima ............. G06N 3/084 |
| 2021/0142456 | A1* | 5/2021 | Varga .................. G06T 1/20 |
| 2021/0158508 | A1 | 5/2021 | Nickkholgh et al. |
| 2021/0166364 | A1 | 6/2021 | Avrahami et al. |
| 2021/0191363 | A1 | 6/2021 | Mehr et al. |
| 2021/0287353 | A1* | 9/2021 | Soltwedel ........ G01N 21/95607 |
| 2021/0337073 | A1 | 10/2021 | Lin et al. |
| 2022/0230301 | A1 | 7/2022 | Thomasset et al. |
| 2022/0309634 | A1* | 9/2022 | Atwood ............... G06V 10/82 |
| 2023/0130751 | A1* | 4/2023 | Magera ............... G01N 23/04 73/1.06 |

FOREIGN PATENT DOCUMENTS

| | | |
|---|---|---|
| CN | 108428067 A | 8/2018 |
| CN | 110308093 A | 10/2019 |
| CN | 110335262 A | 10/2019 |
| CN | 110533635 A | 12/2019 |
| CN | 110940670 A | 3/2020 |
| CN | 111127383 A | 5/2020 |
| CN | 111127417 A | 5/2020 |
| CN | 111141741 A | 5/2020 |
| CN | 111242896 A | 6/2020 |
| CN | 111307835 A | 6/2020 |
| CN | 111524120 A | 8/2020 |
| CN | 111929323 A | 11/2020 |
| CN | 112219270 A | 1/2021 |
| CN | 113034492 A | 6/2021 |
| CN | 113109348 A | 7/2021 |
| CN | 113189112 A | 7/2021 |
| CN | 113260855 A | 8/2021 |
| CN | 113341668 A | 9/2021 |
| CN | 113344880 A | 9/2021 |
| EP | 3635640 A1 | 4/2020 |
| EP | 3809366 A1 | 4/2021 |
| EP | 3828819 A1 | 6/2021 |
| EP | 3841522 A1 | 6/2021 |
| WO | 2018217903 A1 | 11/2018 |
| WO | 2019236506 A1 | 12/2019 |
| WO | 2020022024 A1 | 1/2020 |
| WO | 2020131091 A1 | 6/2020 |
| WO | 2020146163 A1 | 7/2020 |
| WO | 2021045715 A1 | 3/2021 |
| WO | 2021097486 A1 | 5/2021 |

OTHER PUBLICATIONS

Benbarrad et al., "Intelligent Machine Vision Model for Defective Product Inspection Based on Machine Learning", Journal of Sensors and Actuator Network, 2021, 10, 7, 18 pages.
Greenfield, D., "How Artificial Intelligence Works in Quality Control", AutomationWorld, 2022, 15 pages.
Kang et al., "Machine Learning Applications in Production Lines: A Systematic Literature Review", Computers & Industrial Engineering, 149, 2020, 106773, 11 pages.
Schmitt et al., "Predictive Model-based Quality Inspection Using Machine Learning and Edge Cloud Computing", Advanced Engineering Informatics, 45, 2020, 101101, 10 pages.
Wang et al., "Machine Vision Intelligence for Product Defect Inspection Based on Deep Learning and Hough Transform", Journal of Manufacturing Systems, 51, 2019, pp. 52-60.
Wariach, M., "Visual Inspection AI: A Purpose-built Solution for Faster, More Accurate Quality Control", downloaded from the internet Nov. 23, 2021, https://cloud.google.com/blog/products/ai-machine-learning/improve-manufacturing-quality-control-with-visual-inspection-ai, 10 pages.
Great Britain Combined Search and Examination Report for Application No. GB2217054.2, dated May 18, 2023, 6 pages.
Mcaulay, AD et al., "Neural network system for assembly line inspection", IEEE Conference on Aerospace and Electronics, May 21-25, 1990, pp. 1166-1170, retrieved from the Internet: https://ieeexplore.ieee.org/stamp/stamp.jsp?tp=&arnumber=112933&tag=I.
Sun, J., et al., "An adaptable automated visual inspection scheme through online learning", Int. J Adv Manuf Technol., 59:655-667, (2012), retrieved from the Internet: https://link.springer.com/article/10.1007/s00170-0I I-3524-y.

* cited by examiner

METHOD AND PROCESS FOR AUTOMATED AUDITING OF INLINE QUALITY INSPECTION

CROSS-REFERENCE TO RELATED APPLICATIONS

This application claims priority from U.S. Provisional Application No. 63/279,502, filed Nov. 15, 2021, titled METHOD AND PROCESS FOR AUTOMATED AUDITING OF INLINE QUALITY INSPECTION, the contents of which are incorporated herein by reference.

BACKGROUND OF THE INVENTION

Many manufacturing processes have automated quality inspection systems that are integrated into the production line, responsible to monitor the quality of the produced parts, automatically providing alarms when the quality does not pass pre-defined thresholds. The alarms enable manufacturing personnel to take corrective intervention action when appropriate and possible, with or without halting the production process.

However, prior inspection technologies hold an inherent constraint in identifying good and bad material accurately based on the quality requirements defined by brand owners. This is considered a cross-industry, cross-technology limitation which directly impacts the converters' production workflow by adding significant costs invested in personnel, equipment & manual processes, all designed to assure they meet their client's requirement.

One problem with prior inspection technologies is improper utilization of inspection systems by either lowering the sensitivities to reduce false alarms, or alarms ignored by the operator due to false positive, thereby resulting in misdetection. Another problem with inspection technologies today inability to measure inline good product produced due to inaccurate count of good material leads to either under/over assessment of required overruns, or inefficient overrun management.

In addition, different operators with different skill sets operate inspection thresholds differently, resulting in quality inconsistency & additional post-production processes. Later audit and sorting processes based on visual inspection, sometimes by dedicated experts, are helpful, but are time-consuming and error-prone.

In cases in which such intervention is not practical or simply too late, some defective parts will continue along the production line, and need to be attended to later, prior to shipping or use in other production lines. In order to attend to these defective parts, there is a need to mark them for later attention. With physically distinct parts, one method for doing this is to physically eject such parts from the production line, thus sorting them separately from the known good parts. A quality expert can then examine each and every ejected part, and decide whether indeed the defect is so bad as to have to fix the part or permanently remove it, or whether the defect is not so bad, and the part can be returned to the known good parts.

The prime reason this additional audit is required is that inspection systems may often be configured to be more sensitive than is necessary for a given quality level, thus flagging parts that are suspected as having bad quality, while actually they are good enough for the end customer or for the intended use. Defining such quality thresholds is an art of its own, and thus is often dependent on the people involved. The number of quality variables and the complexity of understanding the thresholds are a function of the type of product being produced, and the manufacturing process and technology. For example, in the production of self-adhesive printed labels for applying to varied end products, the quality requirements will be different if the label is to be used in the food & beverage market versus the pharmaceutical market. While all such print quality specifications may include demands such as color accuracy and uniformity, registration between the printed color layers, and text and barcode readability, it is common to see that the quality demands of, e.g., one brand of chocolates may differ from another brand, adding further complexity to setting the inspection thresholds for the automated inline inspection system. An additional reason for the audit is that automated Inspection systems may occasionally incorrectly interpret the product quality, thus generating false alarms. The audit process provides the opportunity for the auditor to remedy these situations.

In the above example, both the inspection and later audit and sorting are based on visual inspection. However, there are manufacturing and inspection processes that include inspection of additional nature, such as electrical testing, dimension and weight measurements, surface smoothness, mechanical strengths, chemical reactivity, and many other functional and aesthetic measure of product quality.

Among the methods to ensure that the defective parts are separated for auditing is the digital database method in which all the parts produced are recorded in a database during the manufacturing process, in which those parts flagged as suspected for being defective are identified as such. Information that is relevant to the type of manufacturing and the type of defect can then be stored in or linked to the database, enabling the quality auditor to digitally review each defective part, and decide if the part is usable (in which case the auditor will reject the defect alert as improper or unnecessary) or not usable (in which case the auditor will accept the defect alert as appropriate and necessary). The advantages of such a solution are speed and ease of audit, as there is no need for physical part removal, which is not always possible, nor for physically handling the suspected defective parts. Such a solution is offered by the assignee of the present application (AVT) in its Helios Print Inspection system, which automatically inspects continuous printed webs of material on which labels are printed, in which the inspection software collects all of the alerts plus snapshots of the defects, and allows the auditor to quickly review each printed roll of material, and indicate whether to "accept" or "reject" each identified defect. Additional tools are provided for efficiency, such as grouping of defects, as well as sorting and filtering of the defects. Once the audit process is complete, the now-modified database can be used to guide or even automatically control the process of removing, replacing, or fixing the defective parts, prior to shipment or prior to being used in further manufacturing phases.

In the above-described existing method, expert personnel are involved in making the final decision on which parts are to be removed, and their decisions are documented in the database, for later tracking and tracing purposes, if and when a need arises to verify why a defective part eventually reached the shelf or the next phase in manufacturing.

This efficient process is currently well-established in at least some segments of the print industry, mainly in the printing of flexible packaging and self-adhesive labels, and mainly in web-printing equipment, where there is no practical and acceptable way to physically remove parts for audit and sorting—making the digital database method particularly useful.

This digital database method as previously employed, however, may be subject to one or more weaknesses. For example, the method is time-consuming and requires the time and attention of experts, whose time is most expensive, and who are needed in other areas of manufacturing. The method tends to be skill-dependent, and thus may be impacted by the skill of the individual performing the audit. This may lead to results that are inconsistent across different shifts and/or lines in the same manufacturing plant, as well as inconsistent across different manufacturing plants for multi-site manufacturers with similar equipment at multiple plants. The lack of consistency is not conducive to the application of a standard Quality Policy, whereas the ability to implement such a policy would be beneficial for serving the standard needs of the entities that ordered the products, as well as in the next phase of manufacturing. Being a manual method based on human input, in addition to being skill-inconsistent, the method is also error-prone. The same manual decisions are typically made repeatedly, for the same parts, same end customers, same manufacturing environments, and same materials. There is no feedback from the auditing decisions to the inspection system, which feedback might enable the inspection system to continuously fine-tune the thresholds and better apply the quality needs of, e.g., the current specific job, the current specific brand, the next phase of manufacturing, etc. Finally, during the manufacturing steps, prior to completion of the audit, information provided by the inspection system regarding how many good parts have been manufactured is not accurate, because the inspection system does not know how many of the identified "defects" will ultimately be rejected. Manufacturing managers thus need to assume some level of defects, and either over-produce to ensure meeting the ordered quantity, or risk under-producing and the need to re-start production, if it is later determined that more good parts need to be produced.

Accordingly, there is a desire in the field for improvements that can overcome or mitigate one or more of the foregoing identified weaknesses.

SUMMARY OF THE INVENTION

One aspect of the invention comprises a system for implementation of quality control, the system comprising a machine vision system configured to capture a plurality of images of instances of the product, and a computer system connected to the machine vision system and having at least one computer processor and computer memory connected to the at least one computer processor. The computer memory contains machine-readable instructions executable by the at least one computer processor for causing the at least one computer processor to automatically digitally evaluate the captured images for a plurality of potential quality defects in the product and generate at least one defect alert associated with a captured image in which the at least one potential quality defect is identified. The instructions further include instructions for storing information about each defect alert in a database log file in the computer memory, including at least a portion of the captured image associated with the defect alert and a classification of the defect alert, and for executing a neural network machine-learning algorithm to process the database log file. Executing the machine-learning algorithm includes, in a learning phase, the steps of receiving human-initiated input of accepting or rejecting each defect alert and storing the human-initiated input in the log file; and in an automated phase, automatically accepting or rejecting at least some defect alerts without performing the step of receiving human initiated input.

In some embodiment, the product is a printed product, such as flexible packaging or self-adhesive labels produced by web-printing or sheet-printing equipment, and the potential quality defects are print defects.

The neural network machine learning algorithm may include at least one filtering algorithm for automatically rejecting at least some defect alerts in accordance with instructions programmed in the computer memory prior to capturing the plurality of images of the product instances. In some embodiments, the neural network machine learning algorithm is configured to process database log files from a plurality of quality control systems distributed across a plurality of production lines.

The system may further include a defect reviewing system in communication with the computer system, the defect reviewing system comprising a display, an associated user interface, and an associated processor programmed with machine readable instructions to cause the captured image associated with each defect alert to be displayed on the display for at least a subset of the defect alerts and to receive the human-initiated input accepting or rejecting each defect alert from the user interface. In some embodiments, the associated processor of the defect reviewing system may comprise a same processor as the at least one computer processor of the computer system.

Another aspect of the invention relates to a computer-implemented method for implementation of quality control. The method comprises the steps of capturing a plurality of images of instances of a product; automatically digitally evaluating the captured images for a plurality of potential quality defects in the product, and generating at least one defect alert associated with the captured images in which the at least one potential quality defect is identified; and storing information about each defect alert in a database log file. The stored information including at least a subset of the captured image associated with the defect alert and a classification of the defect alert. The method further includes executing a neural network machine learning algorithm to process the database log file, including in a learning phase, receiving human-initiated input of accepting or rejecting each defect alert, and storing the human-initiated input in the log file; and in an automated phase, automatically accepting or rejecting at least some defect alerts without receipt of human-initiated input. In the learning phase, the method may include displaying the captured image associated with each defect alert in at least a subset of the defect alerts, and receiving the human-initiated input accepting or rejecting each defect alert based upon the displayed image. The steps of displaying the captured image and receiving the human-initiated input are performed in a location remote from a location of the machine vision system.

The printed product may include flexible packaging or self-adhesive labels made on web-printing or sheet-printing equipment, wherein capturing the images comprises capturing an image of a selected area of a continuous web or a flow of sheets disposed on the web-printing equipment, and the log file includes an identifier of a position on the printed material corresponding to the selected area. The product instances may be produced on a production line having a controller, wherein accepting at least some defect alerts prompts providing a feedback signal to the production line controller effective to stop the production line, to take an action on the defective product instances, or to otherwise impact the behavior of the production line.

The method may include, prior to capturing the plurality of images of the instances of the product, programming the neural network machine learning algorithm with at least one filtering algorithm to automatically reject at least some defect alerts. The neural network machine learning algorithm may process database log files from a plurality of quality control systems distributed across a plurality of production lines.

Another aspect of the invention comprises a system for implementation of quality control, the system comprising a machine vision system configured to capture a plurality of images of instances of the product, and a computer system connected to the machine vision system and having at least one computer processor and computer memory connected to the at least one computer processor. The computer memory contains machine-readable instructions executable by the at least one computer processor for causing the at least one computer processor to automatically digitally evaluate the captured images for a plurality of potential quality defects in the product and generate at least one defect alert associated with a captured image in which the at least one potential quality defect is identified. The instructions further include instructions for storing information about each defect alert in a database log file in the computer memory, including at least a portion of the captured image associated with the defect alert and a classification of the defect alert, and for executing a neural network machine learning algorithm to process the database log file. Executing the algorithm includes automatically accepting or rejecting at least some defect alerts without performing the step of receiving human initiated input. The algorithm for processing the database log file may comprise an algorithm having parameters developed by a neural network machine-learning algorithm programmed with information derived from human-initiated input accepting or rejecting a plurality of learning-phase defect alerts based upon review of a display of a captured image associated with each of the plurality of learning-phase defect alerts.

Still another aspect of the invention relates to a computer-implemented method for implementation of quality control. The method steps of capturing a plurality of images of instances of a product, automatically digitally evaluating the captured images for a plurality of potential quality defects in the product, and generating at least one defect alert associated with a captured image in which the at least one potential quality defect is identified, and storing information about each defect alert in a database log file. The stored information including at least a portion of the captured image associated with the defect alert and a classification of the defect alert. The method further includes executing a neural network machine learning algorithm to process the database log file, including automatically accepting or rejecting at least some defect alerts without receipt of human-initiated input. The algorithm for processing the database log file may comprise an algorithm having parameters developed by a neural network machine-learning algorithm, wherein the method further comprises programming the neural network machine-learning algorithm using human-initiated input accepting or rejecting a plurality of learning-phase defect alerts based upon review of a display of a captured image associated with each the plurality of learning-phase defect alerts.

DETAILED DESCRIPTION OF THE INVENTION

Embodiment of the invention include the use of machine learning to train a neural network (NN) using the manual decisions made by the auditing personnel, whether in ongoing production or accumulated in databases from months and years of pre-existing data, to facilitate automatic prediction of decisions for future manufacturing jobs.

Training of the machine learning algorithm takes into account the same aspects of parts and customers that currently impact the decision of the expert, including but not limited to the identity and quality expectations of the end customer or next phase of manufacturing. Additional considerations may include the time of day or the day of the week, as relevant to commitments to deliver parts on time. Other considerations may include the type of manufacturing process, as well as the specific manufacturing equipment in use, which are relevant to the quality known to be achievable with specific equipment and processes. Those of skill in the art will appreciate that there may be many variants and embodiments of the invention, depending on the nature of the product and process, the commercial agreement between customer and manufacturer, the history of quality-related events of the manufacturer, their internal quality processes, and in some instances, regulatory requirements. The foregoing considerations, if relevant to a specific application, may be taken into account when training the neural network, and may require training separate networks independent of one another, and later selecting which network to use when predicting the auditing decisions of a given manufacturing job on a given day, given time of day, given material set, given manufacturing machinery and process, given end-customer quality policy.

On a plant with multiple production lines, it is possible to train a NN for each line, and maintain these separately. It is also possible to train an additional NN for the entire plant. Having NNs of the lines and the plant as a whole can enable feeding a given production job with suspected defects to all the individual NNs, to test how varied the output is. This will provide a consistency check across machines, and can be used to identify issues and patterns that have escaped the attention of management, such as the difference in the skill of the auditing personnel.

Once the NN have been trained, they can be used to automatically sort and audit the databases, predicting the Accept/Reject decision of the experts. The predictions can be applied automatically to the database, or presented for modifications and acceptance by an expert. Even if the latter is applied, the time required for this activity is orders of magnitude less than for the current manual sorting and auditing. The response of the expert to the predictions can additionally be used to fine-tune the NN and improve their training.

The use of such a mechanism can now be applied also "live" during the inline inspection—and not wait for the completion of production. Given the correct inputs on the mentioned aspects (customer expectations, time of day, etc.) the inline inspection system can apply the prediction on the defects immediately after finding and collecting them, reducing the number of alerts at the source, and providing better information regarding the number of actual good and bad parts produced. Thus, the information that a trained inspection system can present during manufacturing will be accurate, enabling the manufacturer to stop manufacturing when the required total amount of good parts is achieved, and not over-manufacture or under-manufacture.

Figure 1A:
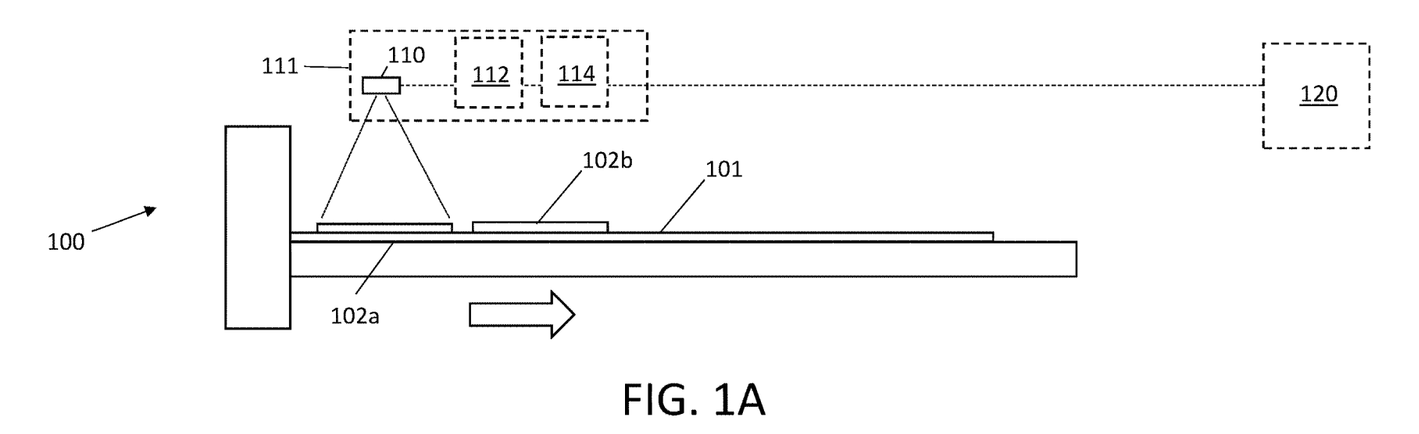
FIG. 1A is a schematic illustration of a side view of an exemplary manufacturing line with an exemplary machine vision system connected to an exemplary inline auditing system embodiment of the invention.
Figure 1B:
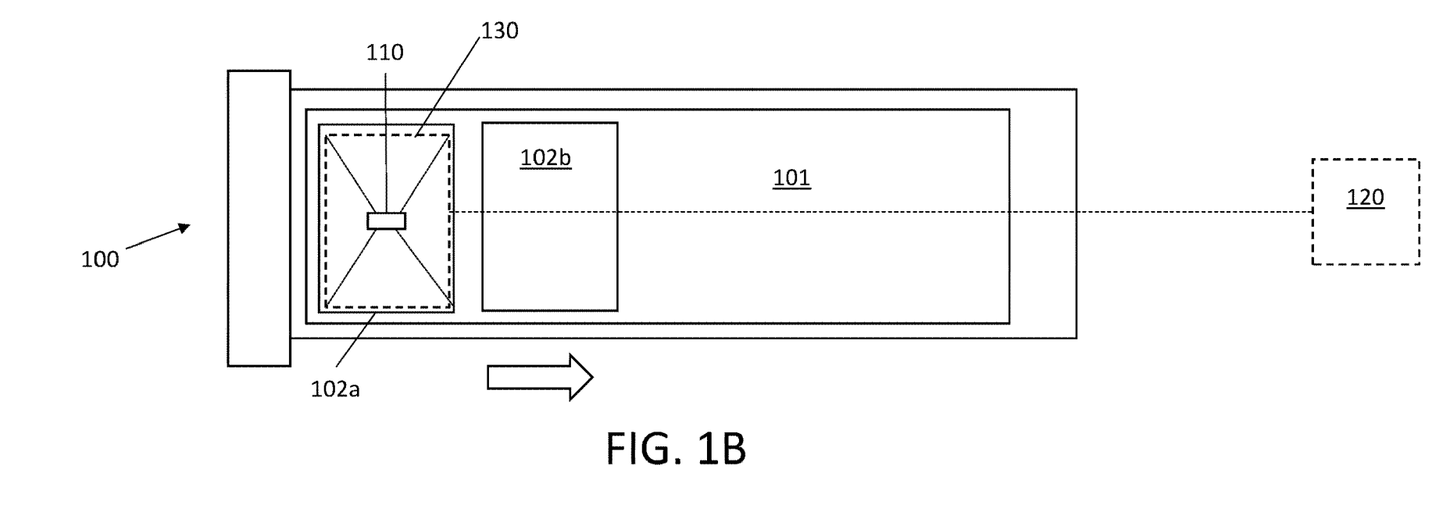
FIG. 1B is a schematic illustration of a plan view of the exemplary manufacturing line, exemplary machine vision system, and exemplary inline auditing system embodiment of FIG. 1A.
Figure 1C:
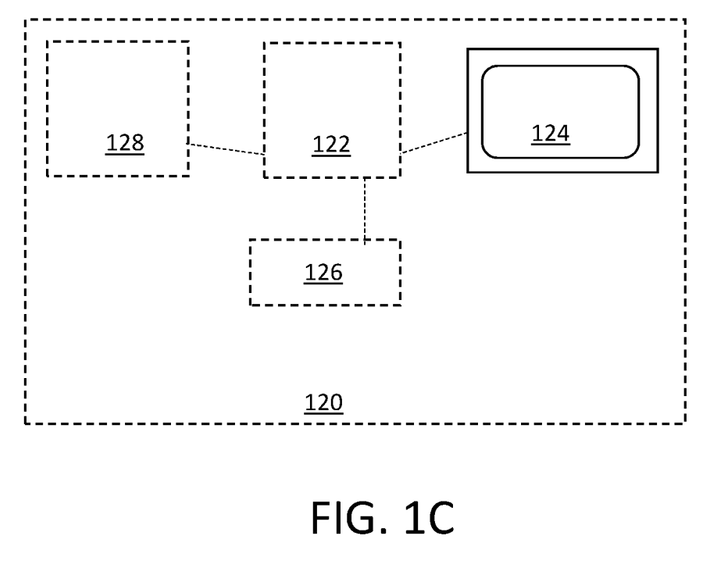
FIG. 1C is a schematic illustration of exemplary components of the exemplary computer system referenced in FIGS. 1A and 1B.

FIGS. 1A-1C illustrate an exemplary system for implementation of quality control in a printing production line 100 configured to produce instances 102a, 102b of a product. As depicted in FIGS. 1A and 1B, the instances comprise printed portions of a continuous web 101, which web may be cut into individual boxes, bags, labels, or the like, in a later process step. It should be understood, however, that the invention is not limited to any type of product at all, let alone any type of printed product, and printed products may include printed images on a continuous web, on discrete sheets or on physical objects, such as beverage cans.

Machine vision system 111 is configured to capture a plurality of quality control images 112 of instances 102a, 102b. Machine vision system may include an image capture device, such as a camera 110, disposed in a position (such as above an output of the production line 100, as depicted in FIGS. 1A and 1B) to capture an image 130 of each product instance, a processor 112 for processing the image, and computer memory 114 for storing the captured image. Computer system 120 is connected to machine vision system 111, and includes processor 122 as well as display 124, user interface 126, and computer memory 128, all connected to the computer processor 122. Although depicted with the respective processors and memories of machine vision system 111 and computer system 120 as separate components, these components may be shared by both systems. It should be noted that while depicted with a single processor, display, user interface, and memory for illustration only, all of the foregoing may comprise one or more than one such element.

Figure 2:
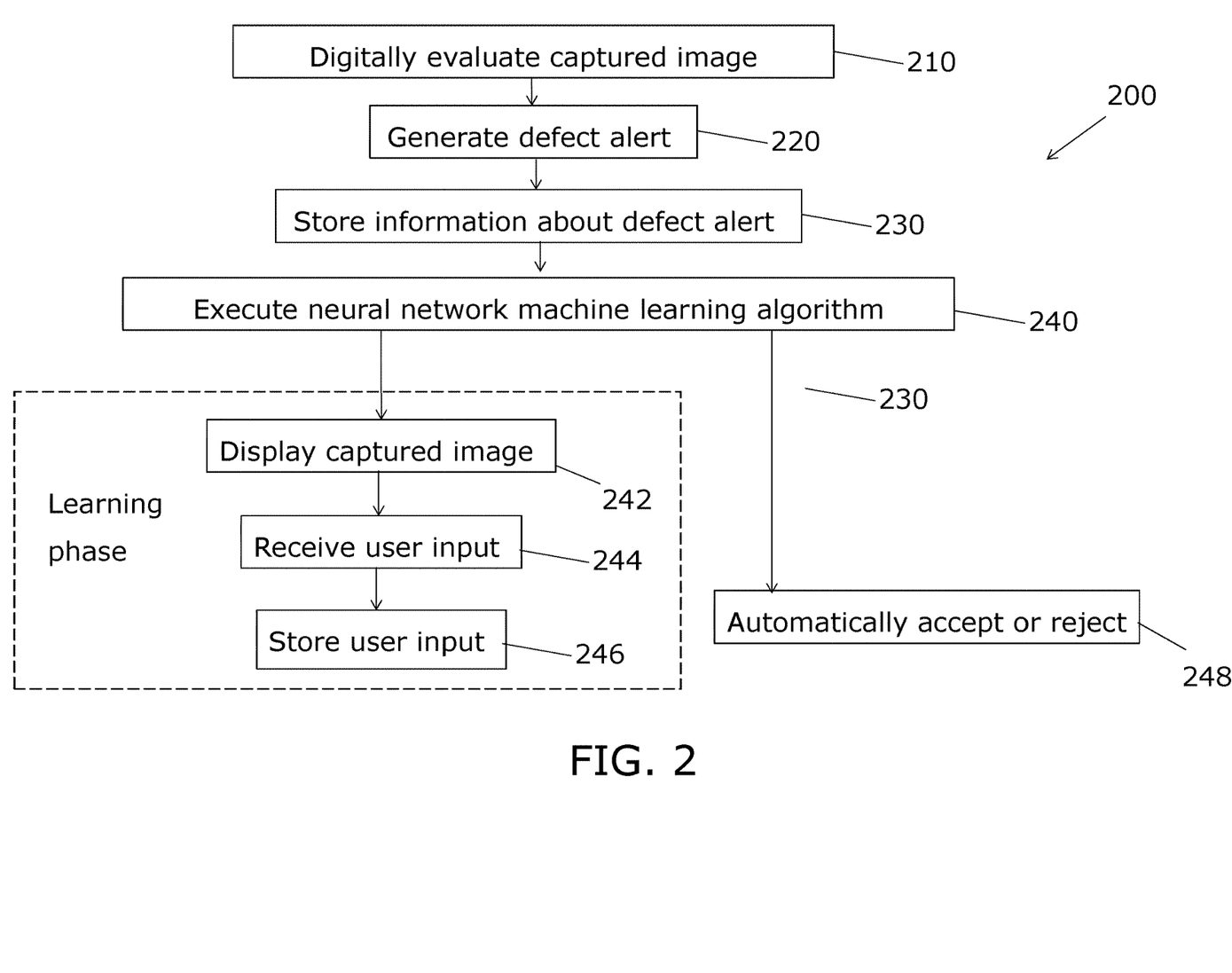
FIG. 2 is a flowchart of an exemplary method embodiment of the invention.

Computer memory 128 contains machine readable instructions executable by processor 122 for causing the processor to automatically perform the method steps 200 set forth in FIG. 2. In step 210, the processor digitally evaluates the captured images and the metadata about the defects that is detected during the conventional processing for a plurality of potential quality defects in the product, and in step 220, generates a defect alert associated with each captured image in which a potential quality defect is identified. Step 210 does not typically apply methods of machine-learning in a print quality defect inspection process, but rather may apply conventional linear image processing algorithms, which include geometrical transformations, pixel-based comparison to a Master reference image, Blob analysis of the difference between the two images, and then specific defect detection algorithms to identify which Blob is a real defect and classify the defects. The Master image is a data set that is prepared for efficient comparison to the manufactured objects. It is acquired prior to inspection, and approved by the manufacturing operator to represent the targeted object. In general, if the ongoing manufactured objects differ enough from the approved Master (e.g. above a predetermined threshold), the manufactured object may be flagged as defective. Creating the Master prior to start of the inspection process may include creating a digital Master image by using design or manufacturing data that sufficiently describes the object being inspected. In the case of printing, this may be a PDF file showing/describing the physical characteristics of the object. Alternatively, the Master may be created from the produced objects themselves. For example, once the production line starts producing objects, the operator of the inspection system may instruct the system to acquire images of the produced object, and define one or more of these images as the reference Master image. The classification depends on the type of manufacturing process and products. In Print inspection, for example, the algorithm tests the x-y aspect ratio of a blob, and classify it as a "streak" if the ratio is higher than some threshold, and as a "spot", if the aspect ratio is below that threshold. Additional such logic can be applied by the Inspection system, without the use of a trained neural network or similar machine-learning technique. The invention is not limited by the methods applied in step 210, which in some embodiments, may include the use of a neural network or other machine-learning. In step 230, the processor stores information about each defect alert in a database log file in computer memory 128, which stored information includes at least a portion of the captured image (e.g. the relevant portion containing the defect, which may be a cropped or otherwise selected portion of the full captured image) associated with the defect alert and a classification of the defect alert. In step 240, the processor executes a neural network machine-learning algorithm to process the database log file. The algorithm includes a learning phase, in step 242, displaying the relevant portion of the captured image associated with each defect alert in at least a subset of defect alerts, in step 244, receiving a human-initiated input accepting or rejecting each defect alert in response to the display, and in step 246, storing the human-initiated input in the log file. In an automated phase of the algorithm, step 248 includes automatically accepting or rejecting at least some defect alerts without the user input receiving step. Although depicted with the display 124 and user interface 126 configured as a part of computer system 120, it should be understood that in other embodiments, the display and user interface (and a computer processor other than from processor 122) may form a discrete reviewing system for reviewing images of defects and providing the human-initiated input used by the neural network machine learning algorithm may constitute a discrete system separate and apart from computer system 120. For example, in a distributed environment, especially as the machine learning process improves over time and becomes automated, with fewer defects needing human review, fewer human reviewers may be needed, such that a single human reviewer or a smaller cadre of human reviewers may be able to review images captured by a plurality of systems on a plurality of production lines from a single location remote from some or all of the production lines. In other systems, processor 122 may be connected via a network with the display and the user interface. The invention is not limited by any particular arrangement or connectivity of the display, user interface, and connection to the computer system 120, or to any presence or absence of other components in the system.

The neural network may include multiple layers of interconnected neurons such that the neural network outputs a final result y with respect to a plurality of original inputs x. At the first layer, the neurons multiply the original inputs x by corresponding weights w, respectively to produce intermediate outputs regarded as feature vectors obtained by extracting feature amounts of the input vectors. These feature vectors may then be input to the next layer of the neural network and multiplied by corresponding weights. This process is repeated throughout each layer of the neural network until the final layer of the neural network outputs final result y.

The inputs x to the neural network may include physical features (e.g. geometrical features, color features, textual features, etc.) extracted from the image of a defect to be audited. The final result y may be a probabilistic determination of whether the defect should be accepted or rejected. Note that the neural network includes both a learning mode and a value prediction mode. For example, it is possible to learn a weight w using a learning data set (e.g. known set of accepting/rejecting defects as determined by the human auditor) in the learning mode and determine an action value using the learned weight w in the value prediction mode (e.g. predicting accepting/rejecting without human intervention). Note that in addition to such accepting/rejecting auditing, also detection, classification, deduction, or the like, may be performed in the value prediction mode.

In one example, the inputs x to the neural network may include data collected during online inspection as well as contextual inputs acquired during operator editing (e.g., rationale of decision, operator's title/position/tenure, etc.). Pairs of regions of interest (ROIs) from reference (e.g. Master) images and defective images either as batch-height-width-depth 'bitmap' tensors or in compressed latent-space form, may be used. For example, encoding (e.g. using a separately trained variational convolutional-layered-auto-encoder bottleneck feature-vector with mean log variance) may be performed on edge (i.e. locally) during inspection to minimize bandwidth for transitioning defect database images. Master-defect ROIs may be inputted/encoded within a class of neural network known as a "Twin Neural Network" (TNN) that uses two or more neural networks acting as a consensus curator for cleaning-out obvious cases where there is an objective undisputed difference or an undisputed similarity where the binary yes/no verdict is essentially pre-known and agreed upon.

The consensus curator can be run either as a pre-process model or as an embedded model with early exit in case the TNN shows an undisputed similarity/dissimilarity. The encoded bottleneck vectors of the reference/defective ROIs join the contextual-based (e.g., location to strategic regions of the print job such as logo, brand-name, etc.) feature columns composing the main model's input dataset. Note, that within the contextual-based data, there can be also features that are extracted numerically from the image (e.g., array blob-properties, Hough-transforms, and histogram-oriented gradients (HOG)). Inference frameworks composed as graph-data-flow entities, where the input is fed-forward in the form of numerical tensors, may be employed where the first layers may be responsible for various purposes of feature-column layer creations. For example, the operator's rank may be prepared for the algorithm by being one-hot-encoded into a feature vector with zeros and ones in the appropriate array cell. For example, operational and/or environmental parameters (e.g. printing press speed, humidity, etc.) may be first bucketized then one-hot-encoded. Brand-name, which is a categorical data column, may be passed through an embedding column, or via a hash-bucket to enable support for all possible brand names. To improve model convergence, some of the feature columns may also be 'feature-crossed' (e.g. multiplied, etc.) to better represent co-occurrence of specific feature combinations together. The model also includes an input-block composed of prepro-cessing-layers, after which all features are set as numerical tensors that can be fed into the subsequent network blocks (e.g. fully-connected, recurrent neural network (RNN), long-term short-term memory (LSTM) network, transformers, etc.)

Prior to the automated phase (e.g. value prediction mode), part of the model deployment phase includes iterations in which a human operator audits/edits/reinforces the initial network outcomes, and may also provide additional data explaining the human operator's rationale. This feedback may be bundled with additional contextual data such as shift and operator information. This additional data can be accumulated across several jobs and occasions or updated recurrently using, for example, convolutional RNN (CRNN), LSTM or attention/transformer-based networks where the input includes uniform feature-extractions with recurrent data that is updated as the operator proceeds with the editing. In either case, a portion of the network's architecture is separately trained (not to be confused with transfer learning), and may be global across all deployment platforms. The image-based feature extractor may include unsupervised (e.g. unlabeled) training where the input and output are the same image, thereby obtaining a deep encoding network for extracting the image features. Alternatively, supervised training can take place by performing transfer-learning using convolutional network frameworks followed by dense-fully-connected layers with the labelled output (e.g. same/different).

The training of the feature-extractor and input curator (e.g. removal of obvious consensus inputs) described above, may take place on a site-independent platform. In contrast, the network updating on recurrent/reinforcement-learning data may take place in the deployment site's platform, which may include a combination of local devices and cloud computing. In the semi-automated deployment phase (where a human operator begins to manually edit initial model AI predictions), a recurrent model such as LSTM may be initialized with the outputs of the feature-extraction network blocks, and be updated to predict subsequent defects based on earlier operator's selections. Again, these earlier selections may be updated from operator's audits within the same job as well as from previous editing done on past site-specific jobs.

For the convolution-network-based feature extractor block, data augmentation may be performed in a domain-specific manner. For example, augmentation may include variances that are expected to be encountered within the problem domain such as local distortions due to material ripples, line-scan sensor encoder 'slips' and down-scaled data (e.g. denoting the same defective blob as a smaller physical size).

There are several methods/approaches to evaluate the networks' performance as well as design the loss function best ensuring model convergence. For example, the feature-extractor block may have its loss calculated as the distance between the input image and the reconstructed image (e.g. auto-encoder's 'decoder' output). In this example, the reference/defect ROI TNN may be trained against a naïve Euclidean distance loss (e.g. between the 2 encoded 'bottlenecks') or have its absolute difference as input to a simple dense network trained with a binarized-cross-entropy loss. Other potential loss frameworks can be used such as the Triplet-Loss framework.

As described above, bandwidth may be reduced by applying the feature-extraction block (e.g. based on convolutional-layers auto-encoder framework) on the edge (e.g. where the image data is being saved during online inspection), thus obtaining a compressed feature vector best preserving salient-for-detection/classification information that is passed to a server-entity to be concatenated with additional 'contextual' features for the auto-editing phase. In addition, for the initial, semi-automated deployment phase, the original (lossy/lossless compressed) human perceivable images may be retained in the reporting database as the human operator requires them for manual overruling. An advantage of performing image feature extraction on edge as described above, is the potential usage during online inspection to rule-out 'pure' false-alarms (e.g., unambiguously attributed to differences unassociated with the actual defective material such as illumination and sensor noise). This allows the system to safely set classic-machine-vision-algorithms based inspection thresholds to 'over-report', thereby addressing issues of misdetection as well. Online inspection may still be partially cloud-computation-powered for tasks that can allow some latency such as actively computing/predicting amount of excess material that needs to be printed to cover for the defective products in that run, since such a decision can be postponed to the end of the run and is based on information throughout the full run.

In some embodiments, the product is a printed product, such as flexible packaging or self-adhesive labels, the defects are print defects, and/or the production line comprises printing equipment.

To the extent that the learning phase includes displaying the captured image associated with each defect alert in at least a subset of defect alerts, the subset of defect alerts for which images are displayed includes only those not encompassed by the automated phase of the algorithm. It should thus be understood that over time, the subset of defect alerts for which images are displayed will shrink relative to the subset of defect alerts that are handled automatically. The neural network machine learning algorithm may include at least one filtering algorithm for automatically rejecting at least some defect alerts in accordance with instructions programmed in the computer memory prior to commencing the capture of images of product instances produced by the production line. Thus, for example, prior to shipping a system to a production plant, the system may be trained by using pre-existing databases that cover expected types of defects the system is likely to encounter in the installation and for which line-specific training is not required.

It should also be understood that the neural network machine learning algorithm may be configured to process database log files from a plurality of quality control systems distributed across a plurality of production lines, such as multiple lines across a single manufacturing location or across multiple locations. The plurality of production lines may be commonly owned, such as by a single manufacturer, or may be commonly used, such as for the benefit of a single brand owner, who may dictate that qualified manufacturers share the databases associated with the manufacture of its product. Furthermore, the maker of the product equipment may share information across multiple installations of its equipment across multiple manufacturers for multiple end products in a way that benefits all users of its equipment, subject to opting in by various stakeholders in view of any confidentiality concerns. Furthermore, the quality control systems may be sourced from multiple vendors, all of which comply with the database requirements defined by the machine-learning solution.

Another aspect of the invention includes a computer implemented method for implementation of quality control in a production line, the method comprising the steps as set forth in FIG. 2. In exemplary methods, the step of accepting at least some defect alerts (automatically or via the user interface) may prompt providing a feedback signal to a controller for the production line effective to stop the production line, to take an action on the defective product instances, or to otherwise impact the behavior of the production line.

Although discussed herein in the context of a printing press operation in which the product instance comprises printed objects, it should be understood that the general concepts as described herein may be applicable to any type of product line making any type of product. It should also be understood that the system as described herein may be used in conjunction with any type of machine vision system, and any type of system for identifying defects, independent of whether or not the identification system itself includes a machine learning system. It should be understood that the systems, methods, and algorithms for evaluating whether images identified as having defects should be acted upon or ignored are different than systems for identifying defects or classifying identified defects, which systems may be integrated with the presently described system, or entirely separate.

For example, one type of algorithm may be used for analyzing a captured image to detect whether there is a defect in the image (e.g. that the image differs in some way from a stored representation of how the image should look). Another type of algorithm may be used for classifying the defect (e.g. that a print nozzle is plugged, or that there is a misregistration of one color separation relative to another). The algorithm as discussed in this invention pertains to how that classified image of the defect should be processed. The algorithm may take into account the amount of deviation represented in the identified defect and the intended use of the printed product (e.g. a pharmaceutical label may have a different quality standard than a potato chip bag).

One potential advantage of embodiments of the invention may include a simplification of the user interface for managing potential defects, while enabling deep customization of the quality assurance process. Using embodiments of the system as described herein may avoid a need to set quality thresholds or to try to accommodate the right quality thresholds to a brand-owner spec, as the system as described may eventually arrive at these thresholds automatically based upon the data input by the user.

Print converters typical invest in onboarding, training and retraining of personnel on how to use quality control systems, in order to protect a balance between detection and quality sensitivities. As opposed to an inspection setup that is fairly simple (e.g. mark text, die-lines, size of label, etc.), managing quality thresholds in defect detection systems may be very complex and/or may contain a very narrow range of possibilities (resulting in either false alarms or low detection capabilities).

Once trained, embodiments of the invention may operate in an unattended or autonomous manner without any connected user interface (using information from a training phase conducted prior to installation and/or using inspection settings received from an external source). While there are known solutions for automating job setup and thus eliminating the need for manual intervention by automatically sending information to the inspection system from, e.g., the system used for creating the print file and leveraging production standards across jobs, printing equipment, shifts and sites without human interaction, the invention as disclosed herein may eliminate or reduce unwanted alarms sufficiently to further minimize or eliminate entirely the need for time-intensive human interaction in the inspection process.

Inspection can be automatically set, either by the inspection deciding on its own how to inspect (based on similar history and machine learning or by an external production management system providing the settings), thus reducing interaction between the press/inspection operator and the inspection system to the point where no user interface may be required, and the system can then operate in an unattended or autonomous fashion. The external production management system providing the settings may comprise a neural network machine learning algorithm programmed with information derived as described herein (e.g. from human-initiated input accepting or rejecting a plurality of learning-phase defect alerts based upon review of a display of a captured image associated with each of the plurality of learning-phase defect alerts). In some embodiments, the fully automated algorithm that reviews defects may itself be such a neural network machine learning algorithm, whereas in others, it may be a fixed algorithm programmed with parameters (e.g. settings, such as weightings for various factors of the algorithm) derived from the use of such an algorithm. An algorithm with fixed settings may be updated periodically, without being capable of machine learning itself.

Applicant's system has many benefits including but not limited to:
  "ease of use"—inspection quality thresholds may be automatically aligned to client's specifications;
  "inspection OEE"—inspection may be ON and functional 100% of the time, thereby eliminating manual process control;
  "labor savings"—minimal human intervention in job edits optimizes use of expert time;
  "process control"—inspection may be utilized to its maximum capabilities, with alerts issued only on relevant issues;
  "exact quantities"—exact counts of good material leads to accurate overrun calculation, with no reprints and no inventory loss;
  "machine uptime"—improved operating equipment efficiency;
  "quality guaranteed"—judgement calls on bad material replacement may be automated and based on expert input; and
  "data utilization"—edits may be reported back to the inspection system for future editing.

As used here, the terms "inspection system" or "quality control system" or formatives thereof may be used interchangeably to refer to the system, without any intended distinction among these terms.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for implementation of quality control, the system comprising:
  a machine vision system configured to capture a plurality of images of instances of a product;
  a computer system, connected to the machine vision system, the computer system comprising at least one computer processor and computer memory connected to the at least one computer processor, the computer memory containing machine readable instructions executable by the at least one computer processor for causing the at least one computer processor to:
    automatically digitally evaluate the captured images for a plurality of potential quality defects in the product, and generate at least one defect alert associated with one or more of the captured images in which the at least one potential quality defect is identified;
    store information about each defect alert in a database log file in the computer memory, the stored information including at least a portion of the captured image associated with the defect alert and a classification of the defect alert;
    execute a neural network machine learning algorithm to process the database log file including the steps of:
      in a learning phase:
        inputting image properties of the products into the neural network machine learning algorithm, the image properties including at least one of geometrical features, color features or textual features of the products,
        processing, by the neural network machine learning algorithm, the image properties, to reject or accept at least some defect alerts,
        receiving human-initiated input rejecting or accepting the at least some defect alerts and storing the human-initiated input in the log file, and
        modifying the neural network machine learning algorithm based on a comparison between the rejected or accepted defect alerts performed by the neural network and the rejected or accepted defect alerts received through the human-initiated input stored in the log file; and
      in an automated phase after the learning phase:
        automatically accepting or rejecting, by the modified neural network machine learning algorithm, at least some defect alerts without performing the step of receiving human initiated input.

2. The system of claim 1, wherein the product is a printed product and the potential quality defects are print defects.

3. The system of claim 2, wherein the printed product comprises flexible packaging or self-adhesive labels.

4. The system of claim 2, wherein the instances of the product comprise printed product produced by printing equipment.

5. The system of claim 1, wherein the neural network machine learning algorithm comprises at least one filtering algorithm for automatically rejecting at least some defect alerts in accordance with instructions programmed in the computer memory prior to capturing the plurality of images of the product instances.

6. The system of claim 1, wherein the neural network machine learning algorithm is configured to process database log files from a plurality of quality control systems distributed across a plurality of production lines.

7. The system of claim 1, further comprising a defect reviewing system in communication with the computer system, the defect reviewing system comprising a display, an associated user interface, and an associated processor programmed with machine readable instructions to cause the captured image associated with each defect alert to be displayed on the display for at least a subset of the defect alerts and to receive the human-initiated input accepting or rejecting each defect alert from the user interface.

8. The system of claim 7, wherein the associated processor of the defect reviewing system comprises a same processor as the at least one computer processor of the computer system.

9. A computer implemented method for implementation of quality control, the method comprising the steps of:
  providing the system of claim 1;
  capturing the plurality of images of instances of the product;
  automatically digitally evaluating the captured images for the plurality of potential quality defects in the product, and generating the at least one defect alert associated with the one or more of the captured images in which the at least one potential quality defect is identified;
  storing information about each defect alert in-a-the database log file, the stored information including at least the portion of the captured image associated with the defect alert and a classification of the defect alert;
  executing the neural network machine learning algorithm to process the database log file, including:
  in the learning phase, receiving human-initiated input accepting or rejecting each defect alert, and storing the human-initiated input in the log file; and
  in the automated phase, automatically accepting or rejecting at least some defect alerts without receipt of human-initiated input.

10. The computer implemented method of claim 9, wherein the product is a printed product and the one or more computer processors is configured to detect print defects.

11. The computer implemented method of claim 10 wherein the printed product comprises flexible packaging or self-adhesive labels produced using printing equipment, wherein capturing the images comprises capturing an image of a selected area of a continuous web disposed on a web-printing equipment and the log file includes an identifier of a position on the continuous web corresponding to the selected area.

12. The computer implemented method of claim 9, wherein the product instances are produced on a production line having a controller, and wherein accepting at least some defect alerts prompts providing a feedback signal to the production line controller that impacts behavior of the production line.

13. The computer-implemented method of claim 12, wherein the feedback signal is effective to stop the production line, change a process parameter of the production line, or take an action on defective product instances.

14. The computer implemented method of claim 9, comprising, prior to capturing the plurality of images of the instances of the product, programming the neural network machine learning algorithm with at least one filtering algorithm to automatically reject at least some defect alerts.

15. The computer implemented method of claim 9, comprising configuring the neural network machine learning algorithm to process database log files from a plurality of quality control systems distributed across a plurality of production lines.

16. The computer implemented method of claim 9, comprising, in the learning phase, displaying the captured image associated with each defect alert in at least a subset of the defect alerts, and receiving the human-initiated input accepting or rejecting each defect alert based upon the displayed image.

17. The computer implemented method of claim 16, wherein the steps of displaying the captured image and receiving the human-initiated input are performed in a location remote from a location of the machine vision system.

18. The system of claim 1, wherein the system is configured to modify the neural network machine learning algorithm based on contextual information of the human providing the human-initiated input.

19. The system of claim 1, wherein the system is configured to encode the image properties prior to being input into the neural network.

20. The system of claim 1, wherein the system is configured to execute a twin neural network to compare the images to known defective images, and remove images having undisputed differences or similarities.

21. The system of claim 1, wherein the machine readable instructions include instructions for causing the at least one computer processor to augment the image properties to account for distortions caused by the machine vision system prior to inputting the image properties into the neural network.

* * * * *